US008624895B2

(12) United States Patent
Reese et al.

(10) Patent No.: US 8,624,895 B2
(45) Date of Patent: Jan. 7, 2014

(54) CONTROLS FOR DIGITAL LIGHTING

(75) Inventors: Charles Reese, Grapevine, TX (US); Mark A. Hunt, Derby (GB)

(73) Assignee: Production Resource Group, LLC, Windsor, NY (US)

( * ) Notice: Subject to any disclaimer, the term of this patent is extended or adjusted under 35 U.S.C. 154(b) by 1976 days.

(21) Appl. No.: 11/332,843

(22) Filed: Jan. 13, 2006

(65) Prior Publication Data

US 2006/0158461 A1   Jul. 20, 2006

Related U.S. Application Data

(60) Provisional application No. 60/646,140, filed on Jan. 20, 2005, provisional application No. 60/657,832, filed on Mar. 1, 2005.

(51) Int. Cl.
*G06T 15/00* (2011.01)

(52) U.S. Cl.
USPC ............ 345/426; 345/84; 345/594; 315/291; 315/292; 315/294; 315/318; 362/3; 362/4; 362/11; 362/85; 362/234

(58) Field of Classification Search
USPC ........ 345/426, 84, 594; 362/3, 4, 11, 85, 234; 315/291, 295, 318, 294, 292
See application file for complete search history.

(56) References Cited

U.S. PATENT DOCUMENTS

| | | | |
|---|---|---|---|
| 4,972,305 A * | 11/1990 | Blackburn | 362/234 |
| 5,406,176 A * | 4/1995 | Sugden | 315/292 |
| 5,414,328 A | 5/1995 | Hunt et al. | |
| 5,502,627 A | 3/1996 | Hunt et al. | |
| 5,588,021 A | 12/1996 | Hunt et al. | |
| 5,769,531 A | 6/1998 | Hunt et al. | |
| 5,788,365 A | 8/1998 | Hunt et al. | |
| 5,812,596 A | 9/1998 | Hunt et al. | |
| 5,921,659 A | 7/1999 | Hunt et al. | |
| 5,969,485 A | 10/1999 | Hunt | |
| 5,983,280 A | 11/1999 | Hunt | |
| 6,029,122 A | 2/2000 | Hunt | |
| 6,057,958 A | 5/2000 | Hunt | |
| 6,175,771 B1 | 1/2001 | Hunt et al. | |
| 6,188,933 B1 | 2/2001 | Hewlett et al. | |
| 6,256,136 B1 | 7/2001 | Hunt | |
| 6,326,741 B1 | 12/2001 | Hunt et al. | |
| 6,466,357 B2 | 10/2002 | Hunt | |
| 6,538,797 B1 | 3/2003 | Hunt | |
| 6,549,326 B2 | 4/2003 | Hunt et al. | |
| 6,597,132 B2 | 7/2003 | Hunt et al. | |
| 6,622,053 B1 | 9/2003 | Hewlett et al. | |
| 6,736,528 B2 | 5/2004 | Hewlett et al. | |
| 6,801,353 B2 | 10/2004 | Hunt et al. | |

(Continued)

FOREIGN PATENT DOCUMENTS

| | | |
|---|---|---|
| EP | 1 646 031 | 4/2006 |
| EP | 1 667 155 | 6/2006 |
| GB | 2 404 109 | 1/2005 |
| WO | 2005/052751 | 6/2005 |

*Primary Examiner* — Phu K Nguyen

(74) *Attorney, Agent, or Firm* — Law Office of Scott C. Harris, Inc.

(57) ABSTRACT

A digitally controlled lighting system where aspects have a central media server connected to remote media servers. The connection may have separate networks for control versus media. Automatic synchronization of the contents of the media servers may be carried out.

51 Claims, 2 Drawing Sheets

(56) References Cited

U.S. PATENT DOCUMENTS

| | | | |
|---|---|---|---|
| 6,891,656 B2 | 5/2005 | Hunt | |
| 6,894,443 B2 | 5/2005 | Hunt et al. | |
| 6,934,071 B2 | 8/2005 | Hunt | |
| 6,967,448 B2 * | 11/2005 | Morgan et al. | 315/295 |
| 7,057,797 B2 | 6/2006 | Hunt | |
| 7,161,562 B1 | 1/2007 | Hunt | |
| 7,205,729 B2 * | 4/2007 | Thielemans et al. | 315/292 |
| 7,231,060 B2 * | 6/2007 | Dowling et al. | 382/100 |
| 7,242,152 B2 * | 7/2007 | Dowling et al. | 315/291 |
| 7,248,239 B2 * | 7/2007 | Dowling et al. | 345/83 |
| 7,309,965 B2 * | 12/2007 | Dowling et al. | 315/318 |
| 7,453,217 B2 * | 11/2008 | Lys et al. | 315/291 |
| 7,589,695 B2 * | 9/2009 | Tanaka | 345/1.3 |
| 7,595,671 B2 * | 9/2009 | Watanabe | 327/156 |
| 7,683,856 B2 * | 3/2010 | Sakai et al. | 345/1.3 |
| 7,683,919 B2 * | 3/2010 | Asahi et al. | 345/690 |
| 7,724,205 B2 * | 5/2010 | Inazumi | 345/1.3 |
| 7,755,582 B2 * | 7/2010 | Hagood et al. | 345/84 |
| 7,777,692 B2 * | 8/2010 | Yamada et al. | 345/2.1 |
| 7,866,832 B2 * | 1/2011 | Jaynes et al. | 353/121 |
| 7,878,671 B2 * | 2/2011 | Hunt | 362/85 |
| 8,264,168 B2 * | 9/2012 | Feri et al. | 315/294 |
| 2001/0050800 A1 | 12/2001 | Hunt | |
| 2002/0070689 A1 | 6/2002 | Hunt et al. | |
| 2002/0109905 A1 | 8/2002 | Hunt et al. | |
| 2002/0141037 A1 | 10/2002 | Hunt et al. | |
| 2003/0107795 A1 | 6/2003 | Hunt | |
| 2004/0061926 A1 | 4/2004 | Hunt | |
| 2004/0125602 A1 | 7/2004 | Hunt et al. | |
| 2004/0160198 A1 | 8/2004 | Hewlett et al. | |
| 2005/0057543 A1 | 3/2005 | Hunt et al. | |
| 2005/0083487 A1 | 4/2005 | Hunt et al. | |
| 2005/0086589 A1 | 4/2005 | Hunt | |
| 2005/0094635 A1 | 5/2005 | Hunt | |
| 2005/0190985 A1 | 9/2005 | Hunt | |
| 2005/0200318 A1 | 9/2005 | Hunt et al. | |
| 2005/0200625 A1 | 9/2005 | Hunt | |
| 2005/0206328 A1 | 9/2005 | Hunt | |
| 2005/0207163 A1 | 9/2005 | Hunt | |
| 2005/0213335 A1 | 9/2005 | Hunt | |
| 2006/0076906 A1 | 4/2006 | Thielemans et al. | |
| 2006/0187532 A1 | 8/2006 | Hewlett et al. | |
| 2006/0227297 A1 | 10/2006 | Hunt | |

* cited by examiner

CONTROLS FOR DIGITAL LIGHTING

CROSS-REFERENCE TO RELATED APPLICATIONS

This application claims priority to U.S. Provisional Applications 60/646,140 filed Jan. 20, 2005 and titled "Control for a digital lighting device" and 60/657,832 filed Mar. 1, 2005 and titled "Controls for Digital Lighting". The disclosures of the prior applications are considered part of (and are incorporated by reference in) the disclosure of this application.

BACKGROUND

Digital lighting has changed the paradigm of the lighting industry. Digital lighting uses a digitally-controllable device to control the lighting effect that is produced, based on an output from a controlling computer. The digital lighting device can therefore be, or include the functions of, a video projector, or a lighting projector, which can project any kind of light, in any shape and in any color. The shape of the light essentially emulates an analog gobo—which is a metal stencil that shapes the outer perimeter of the light that is projected. The digital lighting device can also project video and images. A special server for the video and images, called a "media server", may be used to provide the information to the digital lighting device for projection.

SUMMARY

The present application describes control concepts for use in a light that can project any light, shaped light or video, herein a "digital light."

DETAILED DESCRIPTION

The general structure and techniques, and more specific embodiments which can be used to effect different ways of carrying out the more general goals are described herein.

Figure 1:
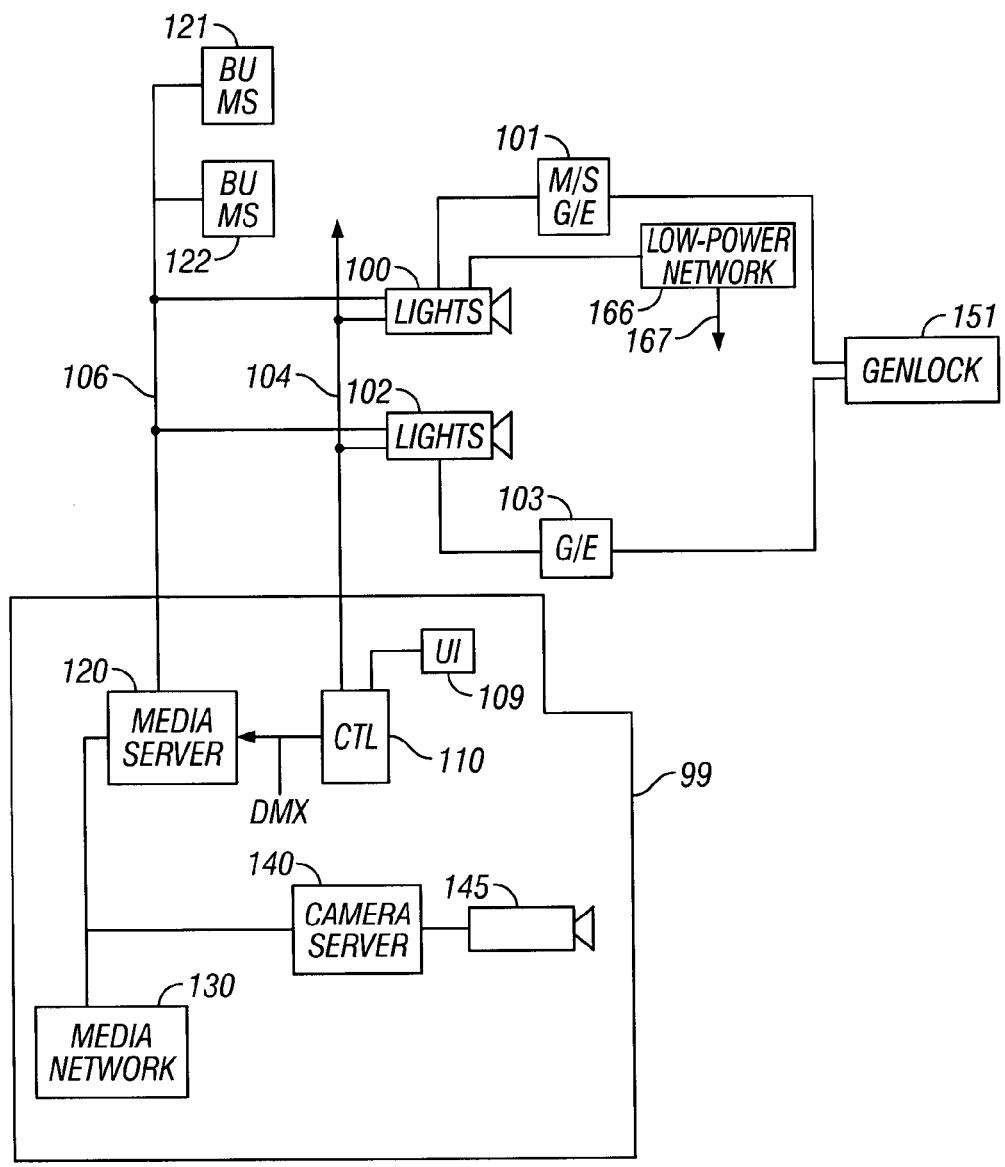
FIG. 1 shows a basic block diagram of the overall system.

A block diagram of the basic system is shown in FIG. 1.

A distributed lighting system is shown with first and second lights 101, 102. It should be understood that these lights are merely exemplary, and that any number of lights, for example between 1 and 1000 lights, could be controlled as part of a single show. The lights may be controlled over a common control line 104 as shown (using an industry standard protocol such as DMX, or using any other protocol), or alternatively can be controlled over multiple control lines. Each of the lights as shown is a digital light, and includes an associated graphics engine, but other lights may alternatively be controlled.

The digital light may control the lighting using a Texas Instrument digital micromirror "DMD" chip or other digital control chip. Graphics engine 101 is shown associated with light 100, and graphics engine 103 is shown associated with light 102. All of the lights and graphic engines are commonly controlled over a control line 104, by a control assembly 99. The control assembly 99 includes a controller 110 which can be a conventional lighting control desk such as the Production Resource Group(TM) Virtuoso (TM), or some other comparable lighting control device.

An aspect describes two separate networks between the control assembly 99 and the lights 100, 101, 102 and remote media servers. One network 104 is used for controlling the media servers 101 and lights 100. A totally separate network 106 is used for providing content to the lights 100 and media servers 101. The dual networks may prevent traffic on one network from effecting the other network. More specifically, control over the control network 104 will not be affected, no matter how much video or media traffic there is on the other network 106. In one aspect, real-time video can be streamed to multiple servers over the second network 106.

The control assembly 99 may control the streaming of real-time video. In an aspect, the control assembly may also stream the outputs, stream at a reduced resolution or thumbnail version, and the like.

It may be important that the user controlling the overall light show sees exactly what is being projected by each of the lights. When the lights are projecting media, that is video or images, or anything else that is based on information in the media server, an aspect described herein allows each of the media servers to return the actual information which is being sent to the control module 110 and finally to be displayed on the user interface 109. This aspect involves each of the media servers streaming a reduced resolution version of what they are actually playing back to the control assembly 99. The control assembly 99 then controls display of a reduced resolution version. The control network 104 can also configure the outputs for resolution of the output, refresh rates, synchronization of playback, monitoring the status, and error reporting.

The embodiment shown herein may use one or multiple back up media servers within the configuration. For example, a configuration with 30 media servers and 30 lights may include two extra media servers for backup in case of a malfunction of any media server. FIG. 1 shows that each light such as 102 includes an associated media server 101. Thus, this system may include both the central media server 120, and the local media servers such as 101. The local media servers may have local storage for media, and may also have a graphics engine allowing local processing of the media. In this configuration, there may also be backup media servers 121 and 122. The central control may also control switchover to back up any media server. The backup media server needs to include all the content that is associated with all of the different media servers. In this way, the backup media server can be used to control any of the lights and to replace any of the other media servers.

The control network 99 includes a control desk 110 with a user interface 104, and is associated with a media server 120 which stores various clips of media that can be projected by the digital lighting devices. Media can include still images, moving images, shapes, effects and/or any other media that can be displayed by the digital lighting devices. This may allow an operator to preview any of the media clips prior to selecting it.

The control line between the controller 110 and the media servers 120, 101, 101 and lights may be any existing control, such as DMX or ethernet. The media server 120 can also communicate with a media workstation shown as 130, as well as a camera server 140 which can communicate with a camera 145. The media workstation and camera server can provide additional media that is served by the media server to each of the plurality of digital lighting devices. The camera and camera server can provide real-time media information, while the media workstation can provide processed information.

In operation, and under control of the controller 110, any of the media on the central media server 120 can be served to any of the digital lighting devices 100, 102. In order to avoid a bandwidth bottleneck, content to be used at some time in the future may be stored locally within a digital lighting device 100, and later signaled for use. Alternatively, it is possible to provide all of the media information to all of the digital lighting devices in real-time. The controller controls the providing of media to the digital lighting device.

In some instances, multiple digital lighting devices may be showing either the same or related video information. Therefore, synchronization may be desired between the local media servers that are associated with the digital lighting devices. Even when the digital lighting devices are not showing related video information, there may be advantages in synchronizing all of the frames that are produced in the graphics engines. A genlock assembly 151 produces a global sync output, that is used for each of the local media servers 101, 103 in at least a plurality of the digital lighting devices. Not all lights need to be synchronized, but preferably at least a plurality of these digital lighting devices are synchronized. The genlock output causes each of the graphics engines in the media servers of each of the digital lighting devices to generate their frames at substantially the same time. This may improve the effect which is produced thereby.

The user interface on the control unit 109, as described above, may include preview functions. These preview functions may include thumbnails of still images. However, for a video clip, the thumbnails may not be adequate. Accordingly, for video, the user interface may show animated versions of the control, for example, an animated GIF or JPEG image. Alternatively, the control system can produce preview movies, for example a clip of reduced resolution of the actual animation. In order to select one of the videos, it may be adequate to only play the beginning portion of the video and the end portion of the video. This way, the designer can select which media clip to use. A frame near the beginning and a frame near the end of the video can be displayed in the thumbnail window. It may be useful to select a frame that is five seconds spaced from the beginning and/or end, to avoid displaying the frame that may display a blank or the like. Alternatively, a frame may be the actual first frame or last frame of the video.

In addition, the control functions on the controller enable changing a media clip according to various controlled characteristics: including fade, cross fade, blur, black-and-white, crop, transition, and other effects. The animated thumbnails show animations of the different effects, to aid the operator in selecting one of these effects. In this way, the server provides a graphical pallet of the controls that are included thereon.

Another graphical control is the 3-D model control. The media server may generate media and map the media to 3-D objects. For example, the media server may provide color effect.

In the embodiment, the media server 101 is physically separate from the light it controls 100. However, each standalone media server may be associated with either one light or a number of lights. It is contemplated that the software and a media server may be updated relatively often. In addition, hardware may become out of date. By separating the media server from the light, it becomes possible to allow the media server to be easily updated. This also provides flexibility: that is any media server can be used with any light.

One aspect defines automated distribution of media to the media servers. For example, the media servers may store various kinds of media clips for use in being projected by the lights. Automated distribution allows making a list of information that each of the media servers should have, and then distributing this information to the media servers. In this embodiment, the media server 120 maintains a database of media at each of the media servers here 101 and 103. In a first embodiment, a system operates so that each media server 101, 103 should have the same media information thereon. Media server 120 includes a list of all information that should be present on all media servers. 101 and 103 periodically report back information about their media, that is, what they actually have stored in their local memories. At each predetermined time, for example, every hour, a processor within the media server 120 compares the media list from each remote media server to the desired contents of media servers 101, 103. If an item of media is not found on either media server, then it is sent at that time.

This may facilitate sending information to the media servers. The media server 120 can be updated with new media. When that happens, new media is added to the global database associated with media server 120 at the next refresh update. All of the media in all of the remote media servers is correspondingly updated to include that newly added media. This can be done by waiting for the next periodic update, or by forcing a new update. For example, one control on the media server 120 may include an 'update now' indication. Also, the media server can automatically force an "update now" each time its database is changed.

In a second embodiment, moreover, each media server includes its own individualized list. For example, the media server 101 has a list of media, including media x and media y. The media server 103 has a list including media x and media 2. The media server 120 periodically receives a list of media from the media servers indicating what media they actually have, and compares it with its own internal list. That way, if media server 101 needs to receive media 1, it can be added to the internal list in media server 120, and then automatically sent to media server 101.

The internal lists which are maintained on the media server may be in XML format, and may include metadata that describes the content of the media.

In addition, a control network may be used which configures the content for the multiple media servers. Each of the media servers may include the same media content or different media content. However, according to an aspect described herein, that media can be added and removed. When something is added, its association can be specified. For example, the association can be designated as being associated with multiple different media servers, or only one media server. In the alternative embodiment, all media on any media server or on the controller is automatically distributed to all the media servers in the system. This may use the separate network 106.

Since the digital lighting device may provide different kinds of digital media, one possible use for that media is for tiling. For example, a video or image may be formed from four separate lights, each of which shows ¼ of the image in a specified location. The overall effect can be obtained by tiling the four image portions together.

One aspect allows preprocessing the image to an open GL compressed format and sending that compressed format to the video card in either the light 100 or the media server 101 that actually will display the information. This uses less bandwidth than other video formats, and allows the card to operate more effectively. In addition, a "shader" may operate in the video card to implement certain effects. This allows certain parts of the processing to be offloaded to the video card, and also allows processing in a venue that may be optimized for pixel and/or vertex operations. The term shader herein is used to describe a shader which complies with any of the shader standards such as 2.0 or 3.0, and may include a pixel shader and/or a vertex shader.

In the embodiment, the shader is used for image processing in a digital light. That is, the shader is used for image processing of a type which can output video, or light, or shaped light, and where the video can be output with an outer shape that has been adjusted by image processing which may include the shader.

The shader may be used to implement a cross fade of a special type, as well as other effects described herein.

A brightness cross fade is described where the brightest part of the new image comes in first, and the least bright comes in last. This brightness cross fade may be implemented in either the shader or in normal image processing software.

Other effects are also described. Each of these effects can be implemented in a shader or in conventional software. A color-specific grayscale forms a grayscale of everything in the image, except for specified colors. This provides an effect where only a color, such as red, is seen as red. Everything else is changed to grayscale. A color range can also be defined so that a certain range of colors is affected in this way. The system can also do the opposite—that is grayscale only one color or only one range of colors.

A blur effect in only a specified area, or in all but a specified area may be carried out. Areas other than the specified area are either maintained in focus, or made to become out of focus.

Another effect is grid system that lays a grid over the image, and causes random shifting of the elements of the grid. This looks like a reflection from glass blocks with grid-ed areas.

A cartoon effect reduces the color set to a minimum set of colors, and also detects edges in the image and draws dark lines around the edges.

An alternative edge detection system draws an edge around the image and renders transparent everything other than the edge.

Another aspect describes using 3-D objects to morph, where the morphing fades from one 3-D object to the other 3-D object.

Another image processing effect is a black-and-white conversion in which an intensity level is set. Everything less bright than that intensity level shows up as white. Everything less bright than that intensity level shows up as black. This may also be used with grayscale.

A special kind of cross fader is also described, which takes pixels from each of two images. The combination is done such that there is X % from image pixel 1 and Y % from image pixel 2.

Another aspect describes wiping from one image to another. This is a cross fade across the screen, where the wiper controls the movement across. The cross fade may occur from the top right corner down, or may occur from left to right or a right to left. Other aspects include cross fades that go through black or white. That is, the image goes from image one, through to black or white, and then back to image 2.

The shader may also be used for zoom in or zoom out. This is done by a cross fading shader to a smaller version of the texture. Another warping aspect works the entire image into a circle or a spiral image, and then unwraps it.

Figure 2:
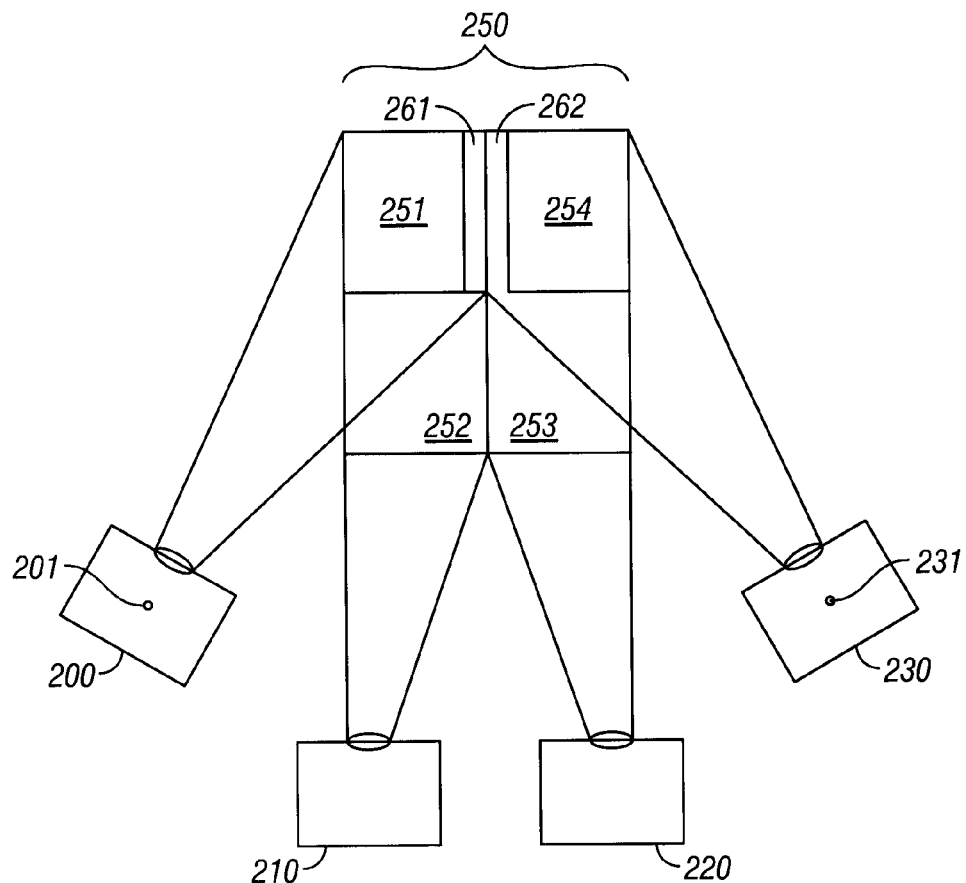
FIG. 2 shows forming a scenic display from multiple lamps.

FIG. 2 shows how four lights 200, 210, 220 and 230 can produce an overall media presentation from four separate projections. The overall video sequence is shown as 250, but is really a combination of the four different portions created by the four different digital lighting devices. The northwest quadrant of the image 250, image portion 251 is formed by light 200. The Southwest portion 252 is formed by light 210, the southeast portion 253 is formed by light 220, and the Northeast portion 254 is formed by light 230. Therefore, the overall image is formed from four different digital lighting devices. This forms a number of edges between the different image portions. The control of the lights 200, 210, 220, 230 includes edge blending effects. For example, the edge 261 of the quadrant 251 may be blended with the edge 262 of the quadrant 254.

Multiple different kinds of media servers may be used, and each media server may be programmed to understand how to produce a tiled image. According to one aspect, multiple different kinds of media servers may be mixed to form a tiled image from the multiple different kinds of media servers.

The controller runs a routine which simulates in three-dimensional space the way that the image will look when projected from four different XYZ locations in space. For example, the image 251 is projected from the XYZ location 201 of light 200. However, the image 254 is projected from a different XYZ location 231 of the light 230. According to this aspect, the image projection is simulated based on the XYZ locations in space, also based on the zoom of each projector, and the effect is simulated. Different aspects of the effect can be varied, including the edge blending, to improve the way the light looks.

The media server can also carry out various image and video processing operations. For example, the media server can play back a video clip in different ways. The media server may use a digital signal processor to create and manipulate three-dimensional objects. In addition, image processing of the video clip can be carried out in order to vary the video clip in a way that allows it to be projected onto a specified surface and/or from a specified angle. Different lighting of objects within the video clip can also be manipulated. For example, this may use conventionally available software such as Maya (TM) to make and manipulate three-dimensional scene.

Another aspect is correcting the projection to have a proper aspect ratio for the surface on which the image has been projected. This is used for automatic keystoning. According to an aspect, the media server automatically knows where it is in 3-D space. From this, a target is calculated. For example if a specific 3-D target is indicated, then the light can automatically go to its current position from its 3-D spatial location to point at that position. By knowing the 3-D information, the light can also calculate information about the angle from which it will receive the keystone. For example, the aspect ratio can be modified to change the angle of this keystoning. In addition to the above, the media server needs to know the light being controlled is located and what the edges of the other images look like. A special falloff for the edges of each image are made to overlap them with the other edges from the other lights.

Real-time information may be used by the media server. For example, as described above, the media server may obtain real-time information from the camera server, which may be indicative of lighting effects and other information. In addition, the real-time information may be used for three-dimensional visualization. When selecting an effect, three-dimensional visualization software may be used to assist the lighting designer in visualizing the actual scene that would be created by the effect or effects being selected.

The media server may also be used for frame blending. In the video sequence, the video is intended to be displayed at a specified rate. If the frames are slowed down, they often look jerky. The media server herein includes a frame blending process, in which each frame cross fades to the next frame. At each of a plurality of times, the system obtains a percentage of the old frame and a percentage of the new frame. Over time, the two frames are cross faded therebetween, so that one fades out while the other fades in. This avoids jerkiness between the frames. This effect can be used with slowed video, or with normal speed video.

The controller for the media server may use a conventional controller which allows selecting each of a plurality of effects, and controlling when those effects are applied. Another aspect of this system, however, is the recognition that control of the media server and specifically a digital media server using a conventional lighting desk does not take into account the realities of a digital light.

Figure 3:
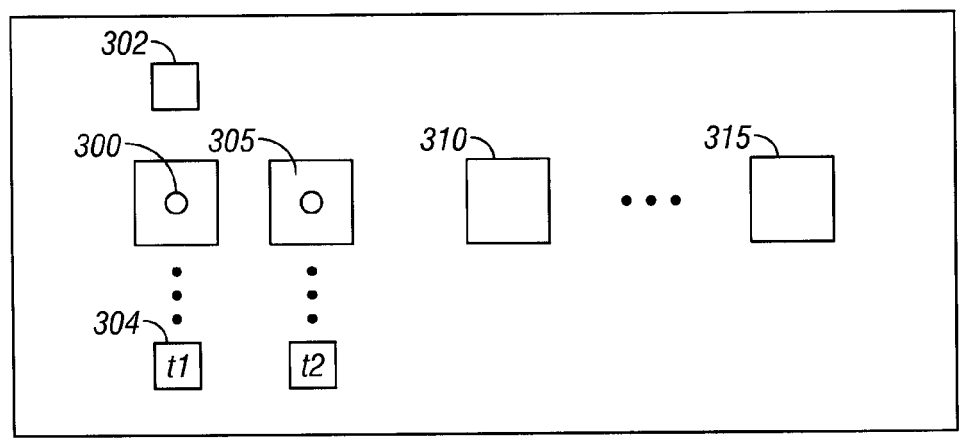
FIG. 3 shows a time-based control for a light;
The figures show additional aspects.

A media controller is described herein which includes timeline oriented control of different media information. The media controller as a number of controls, as shown in FIG. 3. Each control, such as 300, enables browsing all of the different media and effects as described above. The control 300 includes an associated screen 302, or alternatively, the single screen 302 can be used for each of the different controller's 300, 305, 310. In the embodiment, for example, there may be 10 different controller parts. Each controller part is associated with a specified time, which may be labeled specifically as t1 in 304, or may be labeled as a specific absolute time, such as 4 seconds. Each different controller may include a keyboard, or other data entry device. The control of any of the different media can be controlled at any of the different times. In addition, at each time, a specified effect that is prestored can be called up and used.

Clips may be added and dropped on the timeline, and then synced with the show and its timing. The server can be used to figure out how long the clip will actually be, or alternatively how one of the clips should be. The clip is played at its set time slot.

The images themselves may be stored as thumbnails within libraries. The desk or console includes a list of libraries, organized by their specific type; for example clouds, water, or fire. Each library can be accessed to provide a reduced resolution version showing the clips which form the library.

The console also includes a list of the media that the console thinks the media server has. This may be based on the report file from the media server, discussed above. The console can also "order" a media clip, and view the clip. The console also includes reduced resolution versions which are synchronized with the real versions of the media clip, so that controls and graphics from the media server itself can be displayed as a thumbnail. For example, when the media server is displays image X, there may be an associated thumbnail called thumbnail Xc. That thumbnail $X_c$ may be sent back to the main controller, indicating to the central server that media X is being played. This provides an unambiguous without having to send back the entire image of media acts. Each of the controls on each of the media servers include reduced resolution versions, and this includes not only images, but also effects, transitions, and the like.

Another aspect describes use of a wireless low-power network, such as ZigBee. This low-power network forms a mesh of remote sensors. According to this aspect, the lights and/or media servers and/or controllers include two different sets of network operation capability. The normal network operation, over a wired network 104,106, is carried out in real time. However, in addition, there is a battery powered wireless low power mesh network 167, which can be used for initial set up before the power is initially applied. These low-power network devices such as 166 may be battery-operated. It allows setting addresses and other kinds of initial control into the light prior to the wiring. During wiring of the show, the designer is often forced to wait, since there is no power and no wiring. This system allows the lights to be unpacked, and immediately establish the network prior to wiring.

Another aspect of this system is that the lights are allowed to communicate node to node. This may be used for tiling and synchronization, where the lights may communicate synchronization and other communication information directly one to each other.

A rendered 3-D image may also be controlled across multiple servers using a mesh type network, either high power or low-power.

Another aspect relates to licensing of the media in the media servers. The media itself may be stored with keyed information, where a key is required on the machine before the media will actually play. This may be used, for example, in the case of custom media, to allow an author to have access exclusively to their own devices. The media will only play on a specified machine if the key is provided. Therefore, the use of keyed media within a digital light which plays video and projects light, and also allow shaping of light is provided. This system may use, for example, a QuickTime plug-in for this purpose.

Virtual scenery takes cognizance of the problem that there is limited room for scenery on any stage, especially in a Broadway show type production. The users must build the scenery and also move it in and out when there is only very limited space for such scenery. The present system describes projection of virtual scenery. One problem is that the projections are two-dimensional. According to this system, basic geometric shapes are used. A projection onto the shape is made. The projection is warped to track the system into projecting in 3-D.

Conventional 3-D modeling software is used in this system. First, a projection onto a 3-D image is made. A simulated camera is located in the simulation, near the projector. The camera sees the image of how the projection looks on the 3-D shape. An inverse of the way the item looks is used to distort the image to form the real protection, but this system provides very realistic effects. The real projectors must be used to places where they can avoid the actors interfering with the projection, but this system provides very realistic effects.

Usually when controlling an LED light there is no intensity control, but rather only control of RGB. The problem is that the consoles often use an intensity control. Accordingly, when controlling an LED light, the relative brightness of the coolers is set so that the intensity reduces them by 50%. The records from the intensity control is used as the intensity.

Another aspect describes cooling in a lighting fixture. These lighting fixtures are often used in stage environment, where extra light out of the fixture itself, could be very distracting to the audience. It may be desirable to put holes in the fixture in order to allow air circulation. However, light output from these holes would be highly undesirable. Accordingly, baffles and serpentine paths are often used. Another aspect, described herein, describes using a special kind of foam for restricting light but allowing airflow. An aluminum foam allows airflow between inputs and outputs, without allowing light flow. A 1" thick mat of this aluminum foam can be used for restricting light output while allowing airflow.

Another aspect relates to the control of gobo-ing in such a system. In a digital light, the outer shape of the light which is projected may be controlled. One aspect describes using the data indicative of what parts of the image are light and what parts are not light to set the position of framing shutters which frame out the edges of the image which are not being projected. This may be used since even a small image, when projected using the DMD, will have some portions which are overly bright. The framing shutter is located at the image point of the lens after the DMD, and a shutter and iris may also be used alternatively on the translation stage at the image plane. By processing the gobo which is currently being used, the system may contract, automatically, the size to which the framing shutter etc. should be set. After noting that detection, the framing shutter size is automatically detected, and converted into information for the framing shutter. The framing shutter is then used to blot out the portions of the projection other than where the desired light shape is located.

Other embodiments are contemplated, and the disclosure is intended to encompass all embodiments and modifications which might be predictable based on the disclosed subject matter. Also, only those claims which use the words "means for" are intended to be interpreted under 35 USC 112, sixth paragraph. Moreover, no limitations from the specification are intended to be read into any claims, unless those limitations are expressly included in the claims.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while this describes control of a DMD based digital light, other kinds of digital lights may be analogously controllable.

The computers and processors described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A lighting system, comprising:
a control part which produces controls for controlling digital light effects of a plurality of separate digitally controllable lighting devices, and which produces media clips which include multimedia information to be displayed on said plurality of separate digitally controllable lighting devices;
said control part including a first network connection, producing first outputs which are connected over a first network cable to plural remote devices that are connected to said first network cable, and which are remote from said control part, said first network connection having only data that is formatted to control said only said light effects, and said first network connection not having data that is formatted to provide any content for said media clips; and
said control part including a second network connection, producing an output which is totally separate from said first network connection, producing second outputs which are connected over a second network cable to plural remote devices that are connected to said second network connection, and which are remote from said control part, said second network connection having only data that is formatted to produce content for said media clips, and said second network connection not having data formatted for controlling said light effects; and
said control part receiving a version back from at least one of said plural remote devices, indicative of what the at least one of said plural remote devices is actually playing, and controlling display of said version.

2. The lighting system as in claim 1, wherein said light effects include digital commands for movement of the digitally controllable lighting devices to different locations.

3. The lighting system as in claim 1, wherein said lighting effects include digital commands turning on and off light output from the digitally controllable lighting device.

4. The lighting system as in claim 1, wherein said media clips includes real-time video which is streamed to at least one of the digitally controllable lighting devices.

5. The lighting system as in claim 1, wherein said control part includes a lighting control console with controls for a plurality of different digitally controllable lighting devices.

6. The lighting system as in claim 5, wherein said control part includes a media server which stores and provides media, including at least one of video and/or images to each of a plurality of different digitally controllable lighting devices.

7. The lighting system as in claim 6, wherein said second network connection is also connected to said media server.

8. The lighting system as in claim 7, wherein said version is produced from said media server operates and is a real-time representation of a media which is currently being provided, from the actual media that is being provided, and provides said real time representation to said lighting control console.

9. The lighting system as in claim 8, wherein said lighting control console includes a display, which automatically displays said real-time representation.

10. The lighting system as in claim 8, wherein said real-time representation is a reduced-resolution representation.

11. The lighting system as in claim 10, wherein said reduced resolution representation is an animated image indicative of a video.

12. The lighting system as in claim 11, wherein said animated image is one Currently Amended an animated GIF or animated JPG.

13. The lighting system as in claim 10, wherein said reduced resolution representation is a preview movie of a video, which includes only a portion of the video.

14. The lighting system as in claim 13 wherein said portion is a reduced resolution video that has a resolution less than a resolution of the video being displayed.

15. The lighting system as in claim 14, wherein said only a portion includes only a beginning portion of the video, and an ending portion of the video.

16. The lighting system as in claim 15 wherein said beginning portion of the video is a frame near the beginning of the video, and an ending portion of the video is a frame near the end of the video.

17. The lighting system as in claim 16, wherein said beginning portion is a frame spaced by a small amount from the beginning of the video, and said ending portion is a frame spaced by a small amount from the end of the video.

18. The lighting system as in claim 16, wherein said beginning portion is a first frame of the video, and said ending portion is a last frame of the video.

19. The lighting system as in claim 1, wherein said controls include controls which enable changing a media clip according to image processing characteristics.

20. The lighting system as in claim 19, wherein said changing the media clip includes one of fade, cross fade, blur, black-and-white, crop, or transition changing.

21. The lighting system as in claim 19, wherein said control part produces an animated thumbnail indicative of controls which enable changing the media clip according to image processing characteristics, and wherein said control part includes a display, and operates to display said animated thumbnail on said display.

22. The lighting system as in claim 1, wherein said control part controls image processing, using information in a local graphics format that is understood by a video card that actually does the display.

23. The lighting system as in claim 22, wherein said local graphics format is an open GL format.

24. The system as in claim 1, wherein said control part operates to control cross fading between different images by taking specified percentages of each pixel of each image, and changing said specified percentages between pixels of an old image and pixels of a new image.

25. The system as in claim 1, further comprising a third network connection, formed of a low-power wireless network connection.

26. The system as in claim 25, wherein said low-power wireless network connection is a Zigbee type connection.

27. The system as in claim 25, wherein said low-power wireless network connection is operated by battery when AC power is not available.

28. The system as in claim 1, wherein said media clips include at least one media item for said first digitally controllable lighting device which includes a plurality of frames that are displayed in sequence, and at least one media item for said second digitally controllable lighting device which includes a plurality of frames that are displayed in sequence, and further comprising a genlock device, coupled to both of said first and second digitally controllable lighting devices, and synchronizing said first and second digitally controllable lighting device, such that a specified first frame in said at least one media item is displayed at substantially the same time as a second frame in the second media item.

29. A lighting system, comprising:
a control part which produces controls for controlling digital light effects of a plurality of separate digitally controllable lighting devices, and which produces media clips which include multimedia information to be displayed on said plurality of separate digitally controllable lighting devices;
said control part including a first network connection, and producing outputs which control said light effects, but do not provide any content for said media clips; and
said control part including a second network connection, producing an output which is totally separate from said first network connection, producing content for said media clips but not producing any output which controls said light effects, wherein said control part controls cross fade between an old image and a new image, by dimming the old image, and progressively brightening the new image, where the new image has its brightest items displayed first, and its least bright items displayed last.

30. A lighting system comprising:
a control part which produces controls for controlling digital light effects of a plurality of separate digitally controllable lighting devices, and which produces media clips which include multimedia information to be displayed on said plurality of separate digitally controllable lighting devices;
said control part including a first network connection, producing outputs which control said light effects, but do not provide any content for said media clips; and
said control part including a second network connection, producing an output which is totally separate from said first network connection, producing content for said media clips but not producing any output which controls said light effects, wherein said control part controls forming a color specific grayscale, where everything in an image in the media clip except for at least one specified color is changed to grayscale, but said at least one specified color is maintained as its original color.

31. A lighting system, comprising:
a control part which produces controls for controlling digital light effects of a plurality of separate digitally controllable lighting devices, and which produces media clips which include multimedia information to be displayed on said plurality of separate digitally controllable lighting devices;
said control part including a first network connection, producing outputs which control said light effects, but do not provide any content for said media clips; and
said control part including a second network connection, producing an output which is totally separate from said first network connection, producing content for said media clips but not producing any output which controls said light effects, wherein said control part controls setting a threshold intensity level, said everything with a first relation to said threshold intensity level is set to a first color, and everything with a second relation to said threshold intensity level is set to a second color.

32. The system as in claim 31, wherein said first color is white, and said second color is black.

33. A lighting system, comprising:
a control part which produces controls for controlling digital light effects of a plurality of separate digitally controllable lighting devices, and which produces media clips which include multimedia information to be displayed on said plurality of separate digitally controllable lighting devices;
said control part including a first network connection producing outputs which control said light effects, but do not provide any content for said media clips; and
said control part including a second network connection, producing an output which is totally separate from said first network connection, producing content for said media clips but not producing any output which controls said light effects, wherein said controller stores a central database of media information, along with information about which of the digitally controllable lighting devices should have items from said central database of media information, and controls periodically synchronizing between said central database and said digitally controllable lighting devices.

34. A lighting system, comprising:
a first digitally controllable lighting device, controlled by a digital signal and having a digital mirror device therein, which digital mirror device can operate to shape an outer perimeter of a projected light beam, and can also project images and video;
a second digitally controllable lighting device, controlled by a digital signal and having a digital mirror device therein, which digital mirror device can operate to shape an outer perimeter of a projected light beam, and can also project images and video;
a control part which produces controls for controlling digital light effects of said first and second digitally controllable lighting devices, said control part having a central media server which stores and produces media clips which include multimedia information to be displayed on said first and second digitally controllable lighting devices;

said control part including a first network connection, producing outputs which control said light effects, but do not provide any content for said media clips, said first network connection producing first outputs which are connected over a first network cable to plural remote devices that are connected to said first network cable, and which are remote from said control part devices including at least said first digitally controllable lighting device and said second digitally controllable lighting device; and said control part including a second network connection, producing an output which is totally separate from said first network connection, producing content for said media clips but not producing any output which controls said light effects, said second network connection producing first outputs which are connected over a second network cable to plural remote devices that are connected to said first network cable, and which are remote from said control part devices including at least said first digitally controllable lighting device and said second digitally controllable lighting device; and said control part receiving a version back from at least one of said plural remote devices, indicative of what the at least one of said plural remote devices is actually playing, and controlling display of said version.

35. The lighting system as in claim 34, wherein said media clips includes real-time video which is streamed to at least one of the digitally controllable lighting devices.

36. The lighting system as in claim 34, wherein said control part includes a lighting control console including a display portion thereon, and with controls for a plurality of different digitally controllable lighting devices.

37. The lighting system as in claim 36, wherein said central media server operates to produce a real-time representation of a media which is currently being provided, from the actual media that is being provided, and displays said real time representation on said lighting control console.

38. The lighting system as in claim 37 wherein said real-time representation is a reduced-resolution representation.

39. The lighting system as in claim 38, wherein said reduced resolution representation is an animated image indicative of a video.

40. The lighting system as in claim 39, wherein said animated image is one of an animated GIF or animated JPG.

41. The lighting system as in claim 38, wherein said reduced resolution representation is a preview movie of a video, which includes only a portion of the video.

42. The lighting system as in claim 41 wherein said portion is a reduced resolution video that has a resolution less than a resolution of the video being displayed.

43. The lighting system as in claim 42, wherein said only a portion includes only a beginning portion of the video, and an ending portion of the video.

44. The lighting system as in claim 43, wherein said beginning portion of the video is a frame near the beginning of the video, and an ending portion of the video is a frame near the end of the video.

45. The lighting system as in claim 44, wherein said beginning portion is a frame spaced by a small amount from the beginning of the video, and said ending portion is a frame spaced by a small amount from the end of the video.

46. The lighting system as in claim 44, wherein said beginning portion is a first frame of the video, and said ending portion is a last frame of the video.

47. The lighting system as in claim 38 wherein said portion is a reduced resolution video that has a resolution less than a resolution of the video being displayed.

48. The lighting system as in claim 47, wherein said only a portion includes a beginning portion of the video, and an ending portion of the video.

49. The lighting system as in claim 48, wherein said beginning portion of the video is a frame near the beginning of the video, and an ending portion of the video is a frame near the end of the video.

50. The lighting system as in claim 49, wherein said beginning portion is a frame spaced by a small amount from the beginning of the video, and said ending portion is a frame spaced by a small amount from the end of the video.

51. The lighting system as in claim 50, wherein said beginning portion is a first frame of the video, and said ending portion is a last frame of the video.

* * * * *